United States Patent
Ali

(10) Patent No.: US 10,056,838 B2
(45) Date of Patent: Aug. 21, 2018

(54) CIRCUIT AND METHOD FOR REDUCING ANALOG BUCK CURRENT CONTROL LOOP SENSITIVITY TO SUPPLY PATH RESISTANCE

(71) Applicant: Dialog Semiconductor (UK) Limited, London (GB)

(72) Inventor: Shafqat Ali, Graz (AT)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/461,543

(22) Filed: Mar. 17, 2017

(65) Prior Publication Data
US 2017/0277212 A1    Sep. 28, 2017

(30) Foreign Application Priority Data

Mar. 24, 2016 (DE) .......................... 10 2016 204 974

(51) Int. Cl.
*H02M 3/158* (2006.01)
*G05F 1/575* (2006.01)

(52) U.S. Cl.
CPC ............ *H02M 3/158* (2013.01); *G05F 1/575* (2013.01)

(58) Field of Classification Search
CPC ......... H02M 3/155–3/1588; H02M 2001/0009
See application file for complete search history.

(56) References Cited

U.S. PATENT DOCUMENTS

| | | | | |
|---|---|---|---|---|
| 5,446,647 A | * | 8/1995 | Ikeda ................. | H02M 1/4208 363/127 |
| 5,798,664 A | * | 8/1998 | Nagahori ............... | H03F 3/087 327/307 |
| 6,342,817 B1 | * | 1/2002 | Crofts .................. | H03K 3/0231 331/1 R |
| 6,885,745 B1 | * | 4/2005 | Handforth .............. | H04M 3/18 379/399.01 |
| 2007/0069581 A1 | * | 3/2007 | Mino ...................... | H02M 1/42 307/12 |
| 2009/0015216 A1 | * | 1/2009 | Seberger ............... | H02M 3/155 323/234 |
| 2010/0320973 A1 | | 12/2010 | Nishida | |

(Continued)

OTHER PUBLICATIONS

German Office Action, File number: 10 2016 204 974.7, Applicant: Dialog Semiconductor (UK) Limited, dated Jan. 19, 2017, 8 pgs, and English language translation, 10 pgs.

*Primary Examiner* — Yusef A Ahmed
(74) *Attorney, Agent, or Firm* — Saile Ackerman LLC; Stephen B. Ackerman

(57) ABSTRACT

This application relates to a power converter circuit for converting a supply voltage received at an input node and providing, at an output node, a current at the converted supply voltage. The power converter circuit contains a DC-DC converter circuit for generating the current at the output node under control of a control signal, a current sensing circuit for sensing a current indicative of a current at the input node, a voltage adjustment circuit for sensing a voltage indicative of the supply voltage and generating an adjusted voltage on the basis of the sensed voltage and the sensed current, and an error amplifier stage for generating the control signal on the basis of the adjusted voltage and a reference voltage. The application further relates to a method of operating such power converter circuit.

11 Claims, 9 Drawing Sheets

(56) References Cited

U.S. PATENT DOCUMENTS

| | | | |
|---|---|---|---|
| 2011/0115447 A1* | 5/2011 | Lin | H02M 3/1584 323/234 |
| 2012/0080952 A1* | 4/2012 | Yoshikuni | H02J 1/10 307/52 |
| 2013/0114308 A1* | 5/2013 | Liao | H02M 3/33507 363/21.01 |
| 2013/0193945 A1* | 8/2013 | Adest | H01L 31/02021 323/299 |
| 2014/0009131 A1* | 1/2014 | Shilimkar | H02M 3/158 323/271 |
| 2014/0077757 A1* | 3/2014 | Liu | H02J 3/385 320/107 |
| 2014/0077776 A1* | 3/2014 | Nguyen | H02M 3/1582 323/271 |
| 2014/0184098 A1* | 7/2014 | Hebborn | H02M 3/04 315/297 |
| 2014/0197884 A1* | 7/2014 | Cohen | G05F 1/561 327/543 |
| 2014/0225586 A1* | 8/2014 | Covi | H02M 3/1584 323/299 |
| 2014/0232308 A1* | 8/2014 | Watanabe | H02P 27/047 318/400.02 |
| 2015/0364989 A1* | 12/2015 | Chung | H02M 1/12 363/44 |
| 2015/0372613 A1* | 12/2015 | Houston | H02M 3/158 307/31 |
| 2016/0006336 A1* | 1/2016 | Bennett | H02M 1/00 323/271 |
| 2016/0020692 A1* | 1/2016 | Castelli | H02M 1/4208 363/89 |
| 2016/0352128 A1* | 12/2016 | Houston | H02J 7/0068 |
| 2016/0373007 A1* | 12/2016 | Lu | H02M 3/158 |
| 2017/0005608 A1* | 1/2017 | Watanabe | H02P 27/085 |
| 2017/0126074 A1* | 5/2017 | Muratov | H02M 3/156 |
| 2017/0207704 A1* | 7/2017 | Houston | H02M 3/1582 |

* cited by examiner

CIRCUIT AND METHOD FOR REDUCING ANALOG BUCK CURRENT CONTROL LOOP SENSITIVITY TO SUPPLY PATH RESISTANCE

TECHNICAL FIELD

This application relates to power converter circuits and methods for converting a received input voltage and providing an output current at the converted voltage. The application particularly relates to such circuits and methods that may be used in charging circuits of mobile devices, for example.

BACKGROUND

State of the art chargers (e.g., chargers for mobile battery-powered devices) include a variety of feedback loops in order to guarantee their performance under specified operating conditions. One of these feedback loops monitors the input voltage (supply voltage, bus voltage). Cable resistance and source output resistance determine the input voltage to the charger at a given input current. If the charger draws too much current, the input voltage of the charger may drop and, in worst case, cause system faults. In order to prevent drop of the input voltage beyond a certain threshold, the input voltage may be monitored and the input current may be controlled accordingly, for example by controlling the current (output current) that is output by the charger.

Examples of chargers may include a switching DC-DC converter circuit, such as a buck converter. The buck converter may be controlled by a feedback loop that is commonly referred to as analog buck current control (ABCC) loop. In this loop, the input voltage is compared to a reference voltage, for example by means of an operational transconductance amplifier (OTA), and an error voltage for controlling the buck converter is generated on the basis of a result of the comparison. The error voltage may be generated by passing an output of the OTA through a compensation network that may serve to compensate a frequency response of the loop. In such charger, the DC loop gain of the ABCC loop would be given by $$L_{DC} = -[R_{cab}] \frac{A_{ABCC_{OTA}} G_{m_{buck}}}{1 + s\tau_2} \quad [1]$$

where $R_{cab}$ represents the cable resistance, $A_{ABCC_{OTA}}$ is the voltage gain of the OTA (including loading by the compensation network), $G_{m_{buck}}$ is the buck transconductance transfer function, and $\tau_2$ is the dominant time constant of the ABCC loop. As can be seen from equation [1], the DC loop gain $L_{DC}$ is directly dependent on the cable resistance $R_{cab}$. The cable resistance $R_{cab}$ can vary from a few milliohm (in test bench scenarios) to a few ohms (typically one to two ohms, but in the worst case even more, for example due to faulty cables or bad connectors, etc.).

As a result, in state of the art techniques, also the cross-over frequency of the loop changes directly with the cable resistance $R_{cab}$ and the DC gain $L_{DC}$ is low for low cable resistance $R_{cab}$.

All the above facts significantly impede appropriate regulation of the input voltage of the charger.

SUMMARY

There is a need for an improved circuit (power converter circuit) for converting a received input voltage and providing an output current at the converted voltage, and for an improved method (power conversion method) of converting a received input voltage and providing an output current at the converted voltage. There is a further need for such circuit and method that enables reducing sensitivity of a feedback loop for controlling power/current conversion to an input resistance of a supply circuit path supplying the input voltage, such as a cable resistance, for example. There is a further need for such circuit and method that reduces the unity gain bandwidth variation resulting from variation of the input resistance. There is yet further need for such circuit and method that increase gain of the control loop for small input resistance.

In view of some or all of these needs, the present document proposes power converter circuits and power conversion methods having the features of the respective independent claims.

An aspect of the disclosure relates to a power converter circuit or device for converting an input voltage (e.g., supply voltage) received at an input node and providing, at an output node, a current (e.g., output current) at the converted voltage. The power converter circuit/device may include a DC-DC converter circuit for generating the current at the output node under control of a control signal. The DC-DC converter circuit may be a switching power converter (also called switched-mode power converter), such as, for example, a buck converter. The power converter circuit may further include a current sensing circuit for sensing a current indicative of a current (e.g., input current) at the input node. The sensed current may correspond to, or be, the current at the input node (e.g., input current). The power converter circuit may further include a voltage adjustment circuit for sensing a voltage indicative of the input voltage. The sensed voltage may correspond to, or be, the input voltage. The voltage adjustment circuit may be further configured to generate an adjusted voltage on the basis of the sensed voltage and the sensed current. For example, the voltage adjustment circuit may adjust the sensed voltage on the basis of the sensed current. The power converter circuit may yet further include an error amplifier stage for generating the control signal on the basis of the adjusted voltage and a reference voltage. The error amplifier stage may receive the adjusted voltage and the reference voltage as differential input. Accordingly, the control signal may be generated on the basis of a difference between the adjusted voltage and the reference voltage. The error amplifier stage may include an error amplifier, such as an operational transconductance amplifier (OTA), for example. The error amplifier stage may further include a compensation network for receiving and processing an output of the error amplifier.

Configured as above, by referring to the adjusted voltage instead of to the sensed voltage, the power converter circuit has a loop gain of the control loop for the DC-DC converter circuit (e.g., buck converter) that has reduced sensitivity to an input resistance (e.g., cable resistance) of a supply path that is connected to the input node and supplies the input voltage (input current). In particular, this results in reduced unity gain bandwidth variation of the control loop and ensures that the loop gain has a reasonably large value even for very small input resistance. Broadly speaking, using the adjusted voltage instead of the sensed voltage for generating the control signal for the DC-DC converter circuit corresponds to adding a virtual resistance to the input resistance, without suffering from increased current consumption caused by this virtual resistance, and thus without significantly decreased overall efficiency.

In embodiments, the voltage adjustment circuit may be configured to scale the sensed current. To this end, the voltage adjustment circuit may include a current mirror with a scaling ratio for mirroring the sensed current to the scaled current. By referring to the scaled current, overall current consumption of the power converter circuit can be reduced.

In embodiments, the voltage adjustment circuit may include a controllable current sink for sinking, from a voltage level of the input voltage (e.g., from the input node), a sink current that depends on the sensed current. The controllable current sink may sink a current in accordance with the scaled current. The controllable current sink may include a current mirror. The controllable current sink may be coupled (e.g., connected) between ground and the voltage level of the input voltage. For example, the controllable current sink may be coupled (e.g., connected) between ground and the input node. The voltage adjustment circuit may further include a resistive element for passing the sink current through the resistive element. The resistive element and the controllable current sink may be coupled (e.g., connected) in series. Accordingly, the sensed voltage may be dropped by the voltage drop at the resistive element. The voltage drop may depend on the sink current and the resistance of the resistive element. The resistive element may include a resistor. The voltage adjustment circuit may further include a circuit branch coupled (e.g., connected) between the voltage level of the input voltage and ground. For example, the circuit branch may be coupled (e.g., connected) between the input node and ground. The circuit branch may include the resistive element and the controllable current sink coupled (e.g., connected) in series. The adjusted voltage may be output at an intermediate node of the circuit branch between the resistive element and the controllable current sink.

Configured as such, the power converter circuit provides for a simple and efficient implementation of the voltage adjustment circuit that allows adjusting the sensed voltage in dependence on (e.g., in accordance with) the sensed current.

In embodiments, the power converter circuit may further include a reference adjustment circuit for generating the reference voltage for the error amplifier stage on the basis of the sensed voltage and a fixed (e.g., predetermined) reference voltage. The reference adjustment circuit may be configured to generate the reference voltage such that it is offset from the fixed reference voltage by an amount that is determined on the basis of the sensed voltage and the fixed reference voltage (in general, by an amount that depends on the sensed voltage and the fixed reference voltage). According to this configuration, any mismatch between the input voltage and a target input voltage that results from supplying the adjusted voltage (instead of the sensed voltage) to the error amplifier stage can be compensated for.

Another aspect of the disclosure relates to a power converter circuit for converting an input voltage (e.g., supply voltage) received at an input node and providing, at an output node, a current (e.g., output current) at the converted voltage. The power converter circuit may include a DC-DC converter circuit for generating the current at the output node under control of a control signal. The DC-DC converter circuit may be a switching power converter, such as, for example, a buck converter. The power converter circuit may further include a determination circuit (resistance determination circuit) for determining a quantity indicative of a resistance (input resistance) of a circuit path (supply circuit path). The circuit path may be coupled (e.g., connected) to the input node and provide an input current (input voltage) to the input node. The circuit path may include, or correspond to, a cable. The resistance may include, or correspond to, a cable resistance of the cable. The power converter circuit may further include a voltage sensing circuit for sensing a voltage indicative of the input voltage. The sensed voltage may correspond to, or be, the input voltage. The power converter circuit may yet further include an error amplifier stage for generating the control signal on the basis of a reference voltage, the determined quantity, and the sensed voltage. The error amplifier stage may receive the sensed voltage and the reference voltage as differential input. Accordingly, the control signal may be generated on the basis of a difference between the sensed voltage and the reference voltage. The error amplifier stage may further receive the determined quantity (e.g., a voltage or current indicative of the determined quantity), for example at a control terminal of an error amplifier of the error amplifier stage.

In embodiments, the error amplifier stage may include an error amplifier. The error amplifier stage may further include a circuit for adjusting a gain of the error amplifier on the basis of the determined quantity. The error amplifier may be an OTA, for example. The error amplifier stage may further include a compensation network for receiving an output of the error amplifier.

Configured as above, by variably adjusting the gain of the error amplifier, sensitivity of the loop gain of the control loop for the DC-DC converter circuit (e.g., buck converter) to the input resistance (e.g., cable resistance) of a supply path that is connected to the input node and supplies the input voltage (input current) can be reduced. In particular, this allows to ensure a reduced unity gain bandwidth variation and to obtain a reasonably large loop gain even for very small input resistance. On the other hand, variably adjusting the gain of the error amplifier does not affect the main path of the power converter circuit and thus does not result in significantly increased current consumption and significantly decreased overall efficiency.

Another aspect of the disclosure relates to a power conversion method of converting an input voltage (e.g., supply voltage) and providing an output current at the converted voltage. The power conversion method may include performing DC-DC conversion under control of a control signal, for generating the output current. DC-DC conversion may be performed by means of a DC-DC converter circuit, such as, for example, a switching power converter, in particular a buck converter. The power conversion method may further include sensing a current indicative of an input current. The sensed current may correspond to, or be, the input current. The power conversion method may further include sensing a voltage indicative of the input voltage. The sensed voltage may correspond to, or be, the input voltage. The power conversion method may further include generating an adjusted voltage on the basis of the sensed voltage and the sensed current. The power conversion method may yet further include generating the control signal on the basis of a difference between the adjusted voltage and a reference voltage. Generating the control signal may involve using an error amplifier stage. The adjusted voltage and the reference voltage may be supplied to the error amplifier stage as differential input. Accordingly, the control signal may be generated on the basis of a difference between the adjusted voltage and the reference voltage. The error amplifier stage may include an error amplifier, such as an OTA, for example. The power conversion method may further include receiving and processing an output of the error amplifier, for example by a compensation network of the error amplifier stage.

In embodiments, the generating the adjusted voltage may involve scaling the sensed current. This may be performed by means of a current mirror with a scaling ratio for mirroring the sensed current to the scaled current.

In embodiments, generating the adjusted voltage may involve sinking, from a voltage level of the supply voltage, a sink current that depends on the sensed current. Generating the adjusted voltage may further include passing the sink current through a resistive element coupled between the voltage level of the input voltage and a controllable current sink that sinks the sink current. The controllable current sink may sink a current in accordance with the scaled current. The controllable current sink may include a current mirror. The controllable current sink may be coupled (e.g., connected) between ground and the voltage level of the input voltage. Accordingly, the sensed voltage may be dropped by the voltage drop at the resistive element. The voltage drop may depend on the sink current and the resistance of the resistive element. The resistive element may include a resistor.

In embodiments, the power conversion method may further include generating the reference voltage for generating the control signal on the basis of the sensed voltage and a fixed (e.g., predetermined) reference voltage. This may involve generating the reference voltage such that it is offset from the fixed reference voltage by an amount that is determined on the basis of the sensed voltage and the fixed reference voltage (in general, by an amount that depends on the sensed voltage and the fixed reference voltage).

Yet another aspect of the disclosure relates to a power conversion method of converting an input voltage (e.g., supply voltage) and providing an output current at the converted voltage. The power conversion method may include performing DC-DC conversion under control of a control signal, for generating the output current. DC-DC conversion may be performed by means of a DC-DC converter circuit, such as, for example, a switching power converter, in particular a buck converter. The power conversion method may further include determining a quantity indicative of a resistance (input resistance) of a circuit path providing the input voltage (input current). The circuit path may include, or correspond to, a cable. The resistance may include, or correspond to, a cable resistance of the cable. The power conversion method may further include sensing a voltage indicative of the input voltage. The sensed voltage may correspond to, or be, the input voltage. The power conversion method may yet further include generating the control signal on the basis of a reference voltage, the determined quantity, and the sensed voltage. Generating the control signal may involve using an error amplifier stage. The sensed voltage and the reference voltage may be supplied to the error amplifier stage as differential input. Accordingly, the control signal may be generated on the basis of a difference between the sensed voltage and the reference voltage. The error amplifier stage may further receive the determined quantity (e.g., a voltage or current indicative of the determined quantity), for example at a control terminal of an error amplifier of the error amplifier stage.

In embodiments, the control signal may be generated using an error amplifier. The error amplifier may be an OTA, for example. The power conversion method may further include adjusting a gain of the error amplifier on the basis of the determined quantity. The power conversion method may further include receiving and processing an output of the error amplifier, for example by a compensation network of the error amplifier stage.

Notably, the aforementioned methods may be applied to any of the circuits described above, for example as methods of operating these circuits.

It is understood that in the present document, the term "couple" or "coupled" refers to elements being in electrical communication with each other, whether directly connected e.g., via wires, or in some other manner.

Moreover, it will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that methods according to the disclosure relate to methods of operating the power converter circuits according to the above embodiments and variations thereof, and that respective statements made with regard to the power converter circuits likewise apply to the corresponding methods.

BRIEF DESCRIPTION OF THE DRAWINGS

Embodiments of the disclosure are explained below in an exemplary manner with reference to the accompanying drawings, wherein FIG. 1 schematically illustrates an example of a power converter circuit to which embodiments of the disclosure may be applied, FIG. 2 schematically illustrates examples of frequency dependence of control loop gain in the power converter circuit of FIG. 1.

DESCRIPTION

Figure 1:
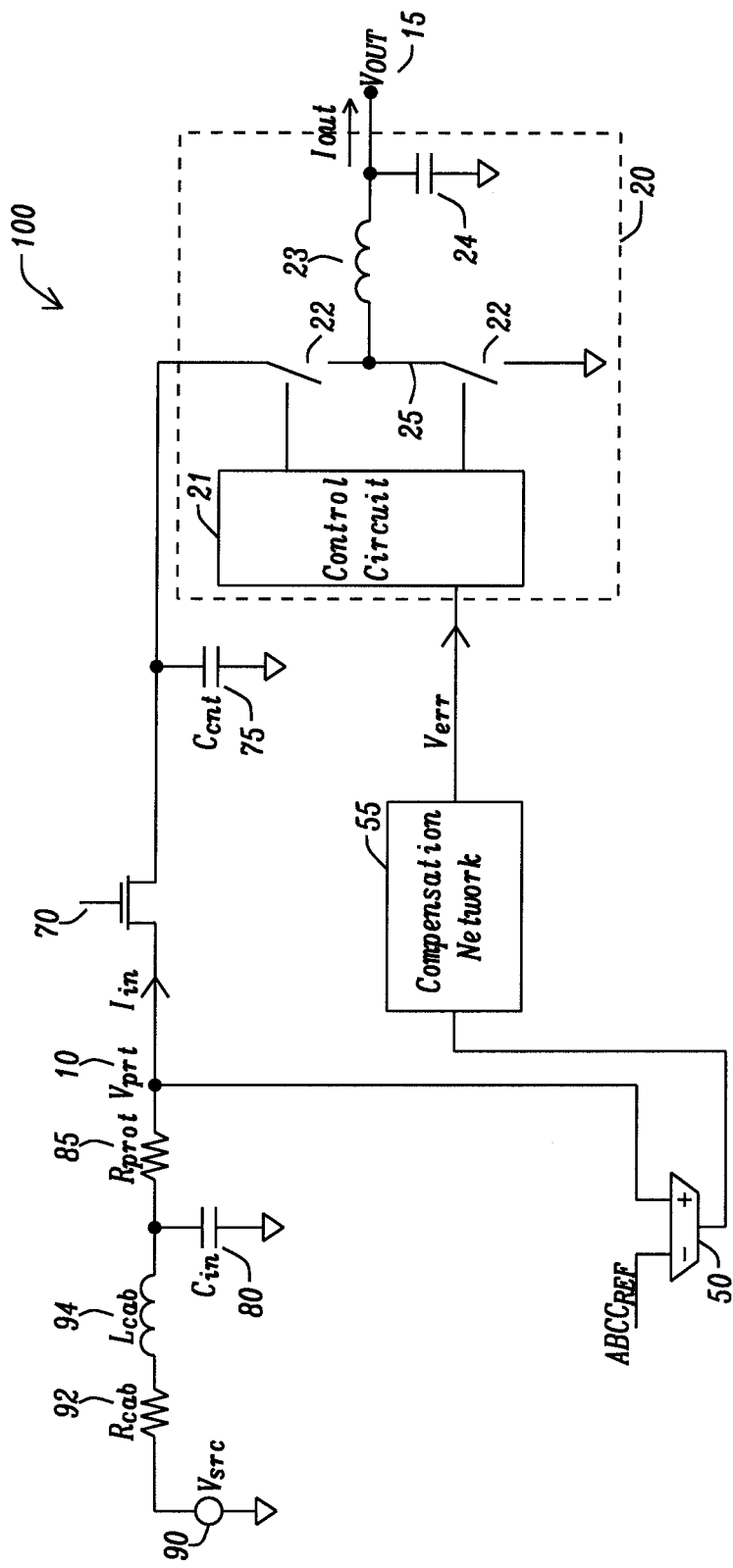

FIG. 1 schematically illustrates an example of a power converter circuit 100 to which embodiments of the disclosure may be applied. The power converter circuit 100 may be part of a charger, such as a charger for mobile battery-powered devices, for example. The power converter circuit 100 may comprise an input node 10 and an output node 15. The power converter circuit 100 may receive an input voltage $V_{prt}$ (e.g., supply voltage or bus voltage) and input current $I_{in}$ at the input node 10, convert the input voltage $V_{prt}$ (e.g., to an output voltage $V_{out}$), and provide, at the output node 15, a current (e.g., an output current $I_{out}$) at the converted voltage. The power converter circuit 100 may comprise a DC-DC converter circuit 20 for generating the current at the output node 15. The DC-DC converter circuit 20 may be a switching power converter, such as a buck converter, for example. The DC-DC converter circuit 20 may operate (e.g., switch) under control of a control signal.

The control signal may be an error voltage $V_{err}$, for example. The control signal may be said to control the current that is passed through the DC-DC converter circuit 20 (in general, the current that is passed through the power converter circuit 100 between the input node 10 and the output node 15).

The DC-DC converter circuit 20 may comprise a set of switches 22 that switch under control of a control circuit 21. The control circuit 21 may control switching of the set of switches 22 in accordance with the control signal. The DC-DC converter circuit 20 may further comprise an LC circuit (filter circuit) comprising an output inductance 23 and an output capacitance 24 connected between a switching node 25 of the DC-DC converter circuit 20 and the output node 15.

The power converter circuit 100 may further comprise a circuit for sensing a voltage indicative of the input voltage (current sensing circuit). The sensed voltage may correspond to, or be, the input voltage $V_{prt}$. The sensed voltage may be obtained by tapping the input voltage $V_{prt}$ at the input node 10, for example. The power converter circuit 100 may further comprise an error amplifier stage for comparing the sensed voltage to a reference voltage $ABCC_{REF}$, and for generating the control signal (e.g., error voltage $V_{err}$) on the basis of the comparison, e.g., on the basis of a difference between the sensed voltage and the reference voltage $ABCC_{REF}$. A voltage level of the control signal (e.g., error voltage $V_{err}$) may be proportional to this difference.

The error amplifier stage may comprise an error amplifier 50 and a compensation network 55. The error amplifier 50 may include, or be, an OTA, for example. The error amplifier 50 may receive the sensed voltage and the reference voltage $ABCC_{REF}$ at its positive and negative (i.e., non-inverting and inverting) input ports, respectively. The error amplifier 50 may then generate a single-ended output (such as a current or a voltage, for example) depending on the differential input, i.e., depending on the difference between the sensed voltage and the reference voltage $ABCC_{REF}$. The output of the error amplifier 50 may be supplied to the compensation network 55, which then generates the control signal (e.g., error voltage $V_{err}$). The compensation network 55 may compensate the output of the error amplifier 50 for the frequency response of the feedback loop that controls the DC-DC converter circuit 20. The feedback loop may be referred to as ABCC loop. The above generation of the control signal may be said to be performed in the ABCC loop.

An input current $I_{in}$ may be supplied to the input node 10 of the power converter circuit 100 by a circuit path (supply path) coupling a voltage source 90 to the input node 10. The circuit path may comprise, or correspond to, a cable. The cable may have cable resistance 92, cable inductance 94 (including parasitic cable capacitance), and cable capacitance 80. The circuit path may optionally further comprise an external switch having resistance 85.

The power converter circuit 100 may further comprise a Field Effect Transistor (FET) 70 that, besides other functions, may act as a protection switch for the power converter circuit 100. The FET 70 may be a large transistor and have low resistance. The power converter circuit 100 may further comprise a capacitive element 75 coupled (e.g., connected) to an input of the DC-DC converter circuit 20 for smoothing the voltage at the input of the DC-DC converter circuit 20.

In the power converter circuit 100, the DC loop gain of the feedback loop may be given by equation [1]. If the feedback (i.e., sensed voltage) for the feedback loop is obtained at the right side of the FET 70 (i.e., at the lower-voltage side thereof), the DC loop gain $L_{DC}$ would be given by $$L_{DC} = -[R_{cab} + R_{FET}]\frac{A_{ABCC_{OTA}}G_{m_{buck}}}{1 + s\tau_2} \quad [2]$$

However, since the resistance $R_{FET}$ of the FET 70 is very small (typically 10 to 20 milliohm), the power converter circuit 100 suffers from the aforementioned problems relating to the direct dependence of the DC loop gain $L_{DC}$ on the cable resistance $R_{cab}$.

Figure 2:
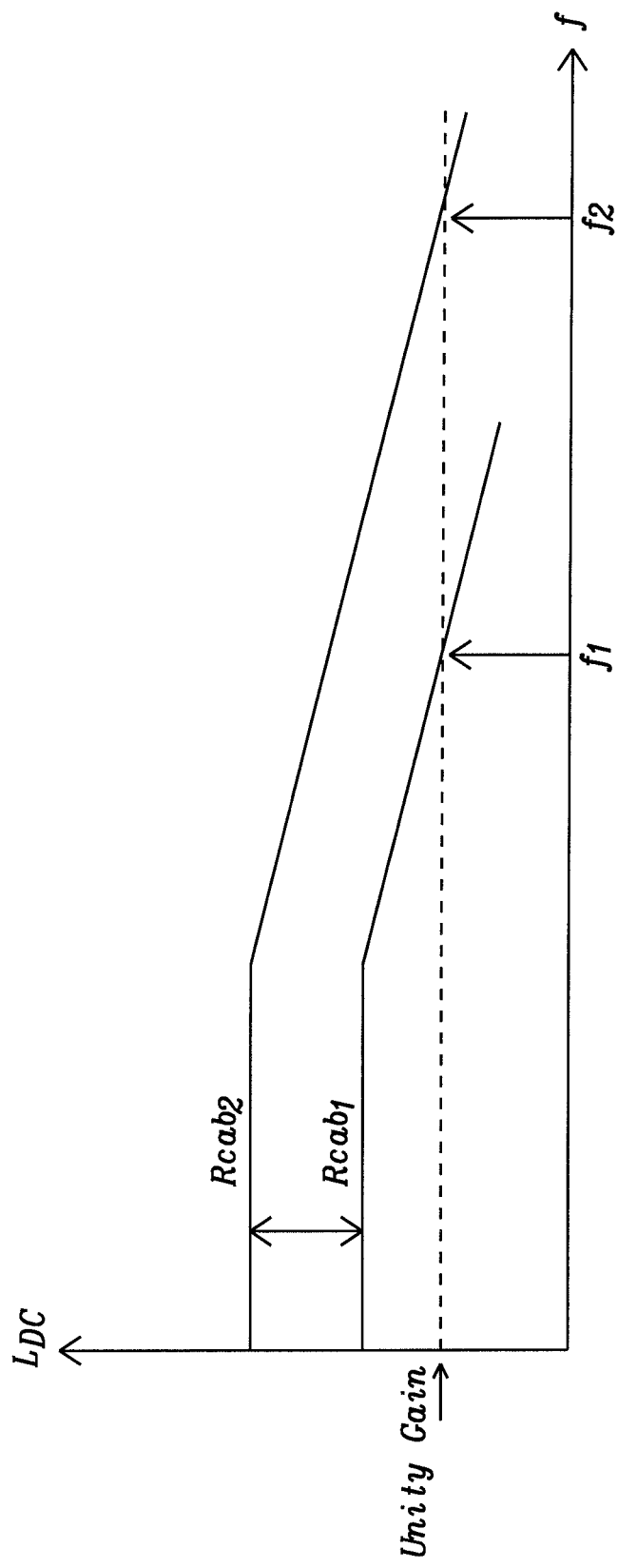

FIG. 2 schematically illustrates the frequency dependence of the DC loop gain $L_{DC}$ in the power converter circuit 100 for different values of the cable resistance $R_{cab}$. The horizontal axis indicates frequency, and the vertical axis indicates DC loop gain. Unity gain is indicated by the dashed horizontal line. As can be seen from this figure, the cross-over frequency (unity gain frequency, i.e., frequency at which the DC loop gain $L_{DC}$ is unity) depends on the cable resistance $R_{cab}$. Accordingly, the cross-over frequency may be equal to $f_1$ for a first value of the cable resistance $R_{cab}$, and equal to $f_2$ for a second, different value of the cable resistance $R_{cab}$.

Next, embodiments of the disclosure will be described with reference to FIG. 3 to FIG. 6. Notably, embodiments of the disclosure may be applied to the power converter circuit 100 described above.

Figure 3:
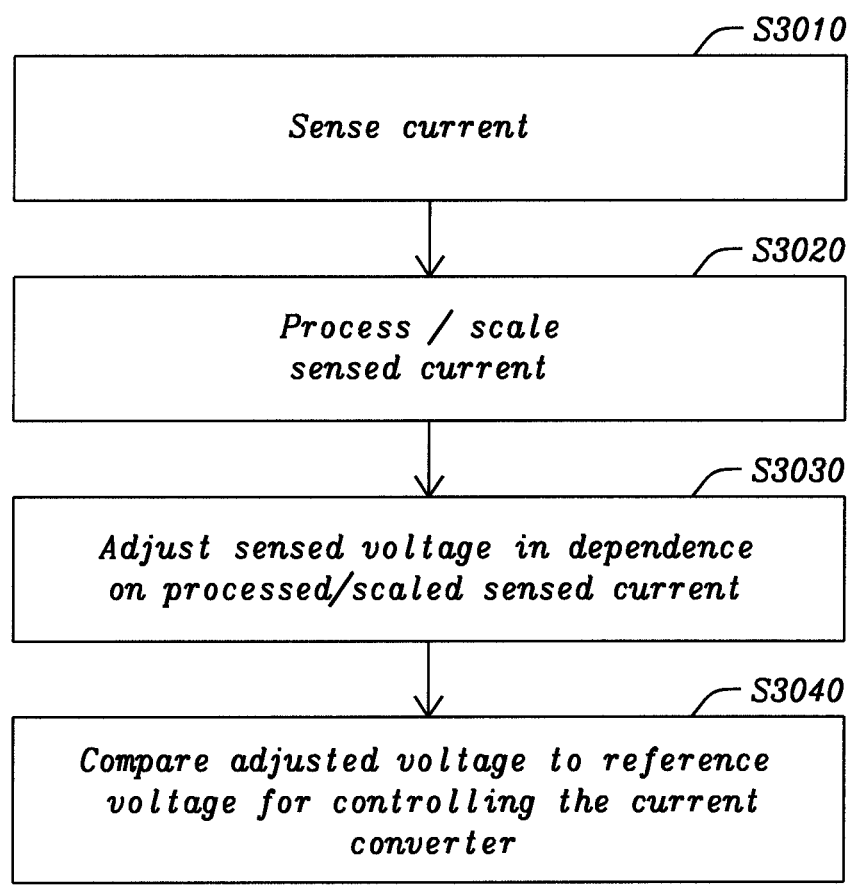
FIG. 3 is a flowchart schematically illustrating an example of operation of a power converter circuit according to embodiments of the disclosure, FIG. 4 schematically illustrates an example of a power converter circuit according to embodiments of the disclosure.

FIG. 3 is a flowchart schematically illustrating an example of the concept of embodiments of the disclosure that may be applied to a power converter circuit, such as the power converter circuit 100 of FIG. 1, for example. At step S3010, the current flowing in the power converter circuit (e.g., the input current $I_{in}$) may be sensed. In other words, an indication of the current flowing through the power converter circuit may be obtained. The current may be sensed at the FET 70. At step S3020, the sensed current may be processed. This processing may include scaling of the sensed current (e.g., by a current mirror) and/or converting the scaled current to a voltage (e.g., by means of a resistance).

At step S3030, the processed current may be used to adjust a sensed voltage that is indicative of the input voltage of the power converter circuit. This adjusting may include dropping the sensed voltage by an amount depending on the (scaled) sensed current. In other words, a portion of the sensed current, after conversion to the voltage domain, may be added to the sensed voltage. This may be said to correspond to adding a virtual resistance to the input resistance (e.g., cable resistance R_cab), wherein the addition is performed such that the main path of the power converter circuit is not affected. Since addition of the virtual resistance does not affect the main path of the power converter circuit, efficiency of the power converter circuit is not compromised or otherwise affected. At step S3040, the adjusted voltage may be compared to a reference voltage and the result of the comparison may be used to control the DC-DC converter circuit of the power converter circuit. Thereby, the input voltage may be controlled to a desired value that depends on the reference voltage.

Figure 4:
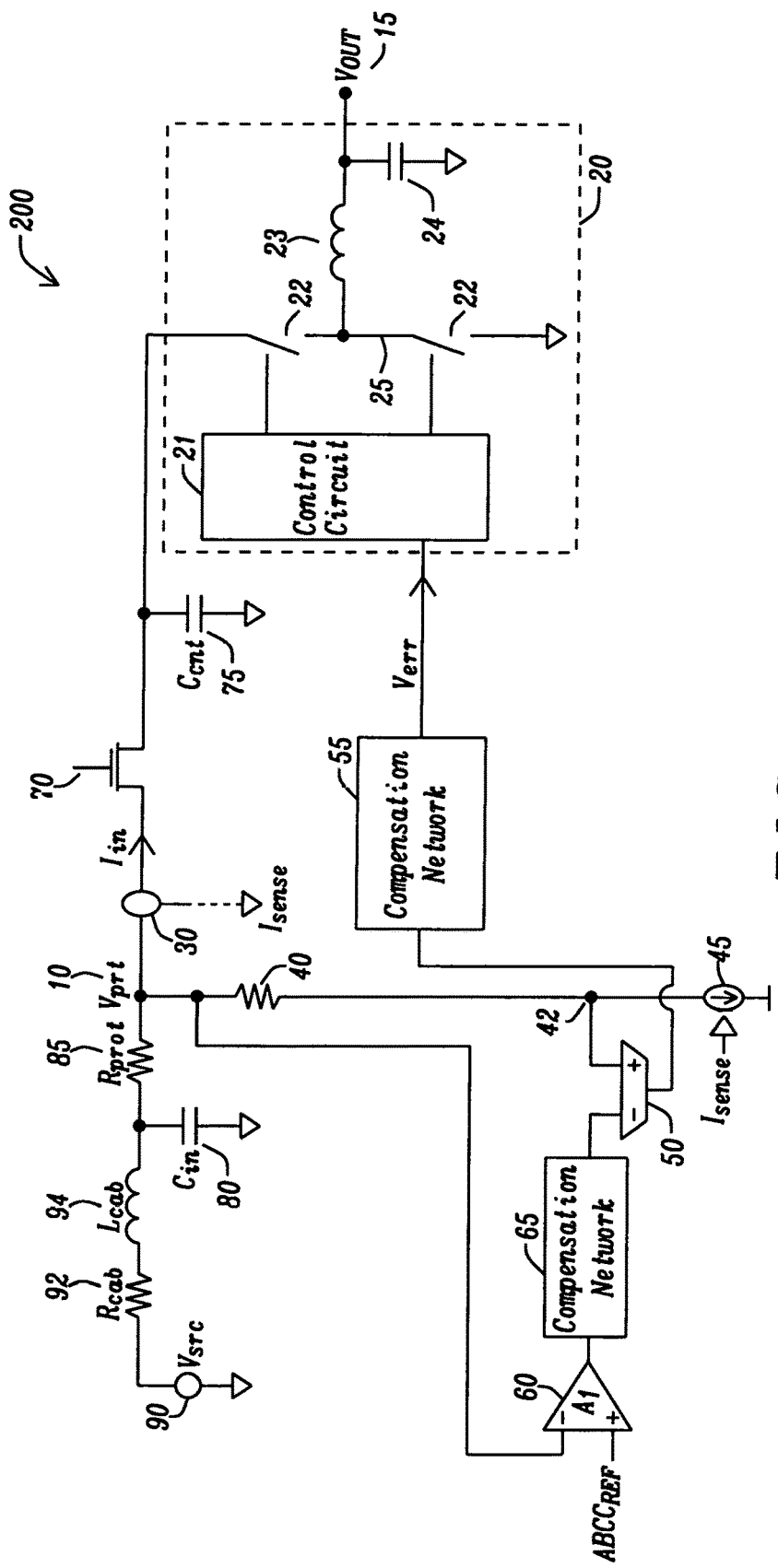

FIG. 4 schematically illustrates an example of a power converter circuit 200 according to embodiments of the disclosure. Unless indicated otherwise, like-numbered elements in FIG. 1 and FIG. 4 are identical and repeated description thereof is omitted for reasons of conciseness.

The power converter circuit 200 may comprise a current sensing circuit 30 for sensing a current indicative of a current at the input node 10 (in general, a current flowing through the power converter circuit 200). The current may be sensed at the FET 70. Sensing the current may proceed by any appropriate means for performing such task, wherein it is understood that several such appropriate means are readily apparent to the skilled person. The power converter circuit 200 may further comprise a voltage adjustment circuit for sensing a voltage indicative of the input voltage $V_{prt}$ (i.e., for obtaining an indication of the input voltage $V_{prt}$). The sensed voltage may correspond, or be, the input voltage $V_{prt}$. However, the sensed voltage may also be lower than the input voltage $V_{prt}$ by a difference voltage resulting from a voltage drop along part of the main path of the power converter circuit 200, e.g., a voltage drop at the FET 70. The voltage adjustment circuit may be further configured to generate an adjusted voltage on the basis of the sensed voltage. The adjusted voltage may be supplied to the error amplifier stage, instead of, as was the case for the power converter circuit 100 in FIG. 1, the sensed voltage. Thus, in respective statements pertaining to the error amplifier stage made above with reference to FIG. 1, the sensed voltage would need to be replaced by the adjusted voltage. For instance, the error amplifier stage of the power converter circuit 200 may be said to generate the control signal (e.g., error voltage $V_{err}$) on the basis of the adjusted voltage and the reference voltage $ABCC_{REF}$. Otherwise, apart from replacing the sensed voltage by the adjusted voltage at its input, the error amplifier stage of the power converter circuit 200 may be identical to the error amplifier stage described above with reference to FIG. 1. In particular, the error amplifier stage of the power converter circuit 200 may comprise the error amplifier 50 and the compensation network 55.

The voltage adjustment circuit may be further configured to scale the sensed current.

Scaling may be performed by a scaling ratio $$\frac{1}{M},$$

where M>1. That is, the sensed current may be larger than the scaled version of the sensed current by a factor of M. To this end, the voltage adjustment circuit may comprise a current mirror (not shown in FIG. 4) with scaling ratio M.

The voltage adjustment circuit may comprise a circuit branch coupled (e.g. connected) between the input node 10 and ground. The circuit branch may comprise, coupled in series, a resistance element 40 and a controllable current sink 45. The resistance element 40 may have a resistance (resistance value) $R_a$.

In general, possible values for the scaling ratio M and the resistance $R_a$ depend on the voltage head room (e.g., the supply voltage) and maximum input current specifications. In particular, the values of the scaling ratio M and the resistance $R_a$ need to be chosen such that the voltage drop across the resistance element 40 remains manageable. If the voltage drop becomes too large, the circuit will saturate. If the voltage drop becomes too small, the effectiveness of the proposed technique reduces. It is therefore preferable that the ratio $$\frac{R_a}{M}$$

of the resistance value $R_a$ of the resistance element 40 and the scaling factor M is set to the maximum value for which saturation issues do not (yet) occur.

In specific, non-limiting embodiments, the scaling factor M may be between $50\text{-}10^3$ (50 k) and 150 k, preferably between 80 k and 120 k. The resistance value $R_a$ of the resistance element 40 may be between 50 kΩ and 150 kΩ, preferably between 80 kΩ and 120 kΩ in these specific, non-limiting embodiments. Moreover, the ratio $$\frac{R_a}{M}$$

of the resistance value $R_a$ of the resistance element 40 and the scaling factor M may be between 0.5Ω and 1.5Ω, preferably between 0.8Ω and 1.2Ω. The scaling factor M and the resistance value $R_a$ may be programmable parameters.

The controllable current sink 45 may be configured to sink a current that depends on the sensed current from the input node 10. In particular, the controllable current sink 45 may sink a current that depends on the scaled current. For example, the sink current may correspond to, or be equal to, the scaled current. The controllable current sink 45 may comprise a current mirror for generating the sink current in dependence on the sensed current. The sink current may pass through the resistance element 40, thereby resulting in a voltage drop across the resistance element 40. The voltage drop at the resistance element may be given by $$I_{sense} \cdot \frac{R_a}{M},$$

where $I_{sense}$ is the sensed current. For the sense current corresponding to the input current $I_{in}$, the voltage drop would be given by $$I_{in} \cdot \frac{R_a}{M}.$$

The adjusted voltage may be obtained by tapping a voltage at an intermediate node 42 between the resistive element 40 and the controllable current sink 45. The adjusted voltage may correspond to the sensed voltage (e.g., input voltage) shifted down by the voltage drop at the resistance element 40. The intermediate node 42 of the circuit branch of the voltage adjustment circuit may be coupled (e.g., connected) to an input port of the error amplifier stage (e.g., to an input port of the error amplifier 50).

In embodiments, the power converter circuit 200 may further comprise a reference adjustment circuit for generating the reference voltage that is supplied to the error amplifier stage as part of the differential input. The reference adjustment circuit may generate the reference voltage on the basis of the sensed voltage and a fixed (e.g., predetermined) reference voltage. The reference adjustment circuit may comprise an error amplifier 60 (second error amplifier) and a compensation network 65 (second compensation network). The second error amplifier 60 may receive, at its positive and negative input ports, the fixed reference voltage (corresponding to reference voltage $ABCC_{REF}$ in FIG. 1) and the sensed voltage, respectively. To this end, one of the input ports of the second error amplifier 60 may be coupled (e.g., connected) to the input node 10. An output of the second error amplifier 60 may be supplied to the second compensation network 65, which then outputs the reference voltage for use by the error amplifier stage of the power converter circuit 200. Thus, an output of the second compensation network 65 (in general, an output of the reference adjustment circuit) may be connected to the other input port of the error amplifier stage (e.g., to the other input port of the error amplifier 50).

The reason for providing the reference adjustment circuit is the following. Without providing the reference adjustment circuit, the input voltage $V_{prt}$ would be regulated to be substantially equal to the reference voltage $ABCC_{REF}$ plus the voltage drop at the resistance element 40 (strictly speaking, the input voltage $V_{prt}$ reduced by the voltage drop at the resistance element 40 would be regulated to substantially match the reference voltage $ABCC_{REF}$) by regulating the current flowing in the DC-DC converter circuit 20. In order to ensure that the input voltage $V_{prt}$ is regulated to the predetermined reference voltage $ABCC_{REF}$, the reference voltage that is used for comparison at the error amplifier stage needs to be adjusted. This may be done by means of the reference adjustment circuit. It is however understood that the reference adjustment circuit is optional and not strictly necessary for operation of the power converter circuit 200. If the power converter circuit 200 does not comprise the reference adjustment circuit, the voltage drop $$\Delta V = I_{sense} \cdot \frac{R_a}{M}$$

across the resistive element 40 may be taken into account when setting the reference voltage $ABCC_{REF}$.

Summarizing key aspects of the disclosure, the current flowing through the power converter circuit 200 may be sensed and then scaled down by a factor M. The scaled current may be passed through the resistive element 40 which is connected to the input node 10. The input voltage $V_{prt}$, reduced by the voltage drop at the resistive element 40, may then be fed to the error amplifier stage for comparison to the reference voltage $ABCC_{REF}$ (or the adjusted reference voltage). Thereby, an additional fixed and reasonably large input resistance (e.g., cable resistance $R_{cab}$) is emulated, without significantly reducing efficiency of the power converter circuit 200 (i.e., of power conversion). By virtue of the large emulated input resistance, the dependence of the DC loop gain and bandwidth of the feedback loop of the power converter circuit 200 on the actual input resistance is substantially diminished and a reasonable DC loop gain can be attained even for small values of the actual input resistance.

For the power converter circuit 200 of FIG. 4, the DC loop gain $L_{DC}$ is given by $$L_{DC} \approx -\left[\frac{R_{cab}A_1\left(1 + \frac{s\tau_1}{A_1}\right)}{1 + s\tau_1} + \frac{R_a}{M}\right]\frac{A_{ABCC_{OTA}} G_{m_{buck}}}{1 + s\tau_2} \quad [3]$$

where $A_1$ represents a gain of the second error amplifier 60, and $\tau_1$ is the time constant of the second error amplifier 60 (e.g., loaded with the second compensation network 65). $\tau_2$ is the dominant time constant of the ABCC loop. Equation [3] assumes that M and $A_1$ are large enough so that their reciprocals can be ignored for simplicity. $R_{cab}$ is multiplied by factor $A_1$ in equation [3]. Notably however, the reference adjustment circuit including the second error amplifier 60 and the second compensation network 65 is optional, as indicated above.

As can be seen from equation [3], a term $$\frac{R_a}{M}$$

(having a typical value close to 1Ω, for example, such as a value between 0.8Ω and 1.2Ω) is added to the cable resistance $R_{cab}$. Thus, the DC loop gain $L_{DC}$ is given by the sum of two terms. If one of these terms reduces too much (e.g., because of low cable resistance $R_{cab}$), the other one still remains. As a result, even if the cable resistance $R_{cab}$ is negligibly small, the DC loop gain $L_{DC}$ has a defined minimum value. Effectively, a virtual resistance of $$\frac{R_a}{M}$$

is added in series with the cable resistance $R_{cab}$, without causing a corresponding increase in current consumption and loss in efficiency. The defined minimum value of the DC loop gain $L_{DC}$ may be given by $$L_{DCmin} \approx -\frac{R_a}{M}\frac{A_{ABCC_{OTA}} G_{m_{buck}}}{1 + s\tau_2} \quad [4]$$

Equation [3] can be written as $$L_{DC} \approx -\left[\frac{R_a}{M}\right]\frac{A_{ABCC_{OTA}} G_{m_{buck}}}{1 + s\tau_2} - \left[\frac{R_{cab}A_1\left(1 + \frac{s\tau_1}{A_1}\right)}{1 + s\tau_1}\right]\frac{A_{ABCC_{OTA}} G_{m_{buck}}}{1 + s\tau_2} \quad [5]$$

At frequencies higher than $$\frac{A_1}{\tau_1},$$

equation [5] can be approximated by $$L_{DC} \approx -\left[\frac{R_a}{M} + R_{cab}\right]\frac{A_{ABCC_{OTA}} G_{m_{buck}}}{1 + s\tau_2} \quad [6]$$

Figure 5A:
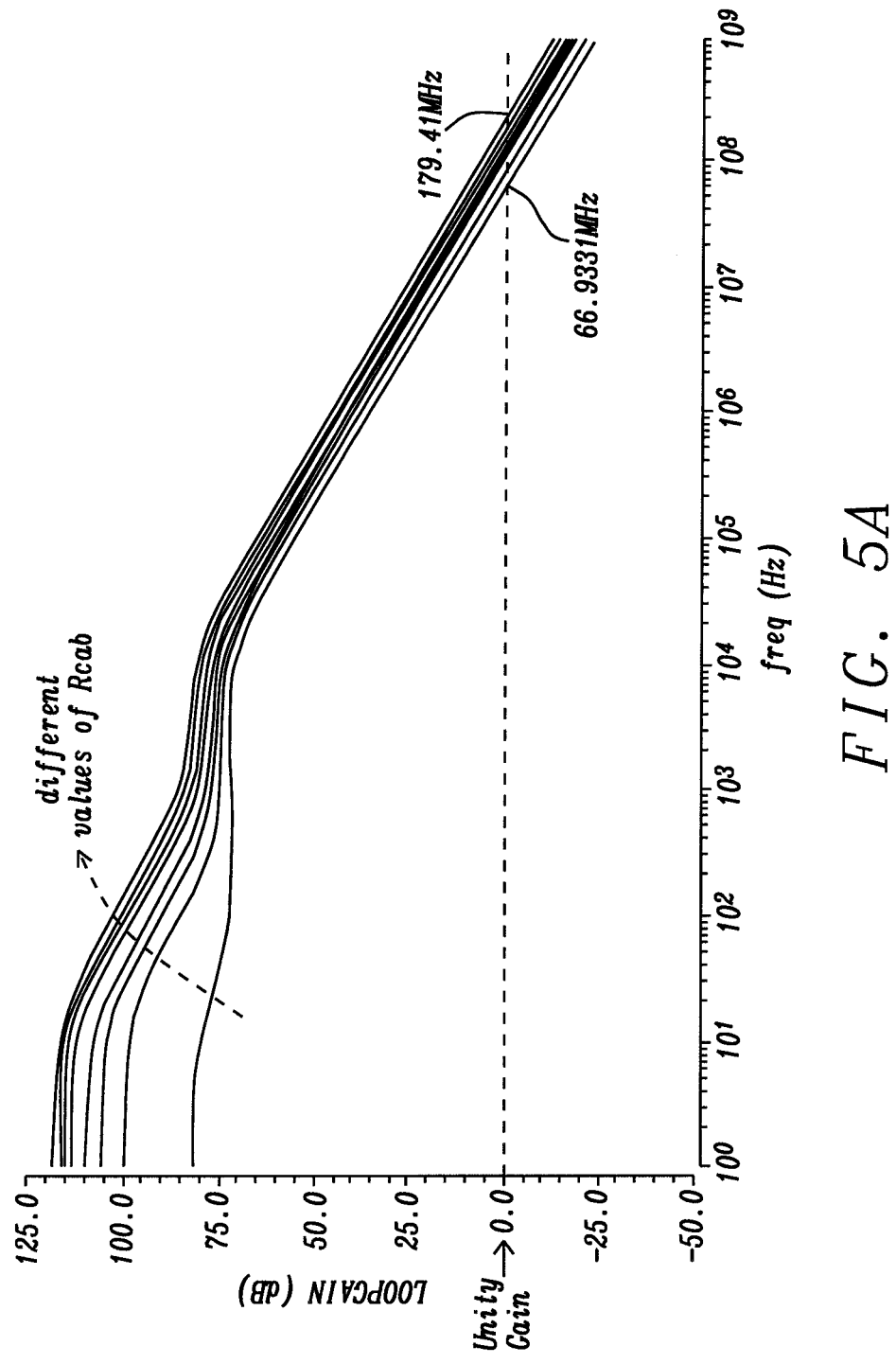
FIG. 5A and FIG. 5B illustrate simulated examples of frequency dependence of control loop gain in the power converter circuit of FIG. 4, FIG. 6 schematically illustrates another example of a power converter circuit according to embodiments of the disclosure, FIG. 7 schematically illustrates an apparatus for monitoring a process of powering an electronic device, and FIG. 8 schematically illustrates various signals involved when estimating a real part and an imaginary part of a complex impedance of a cable assembly.
Figure 5B:
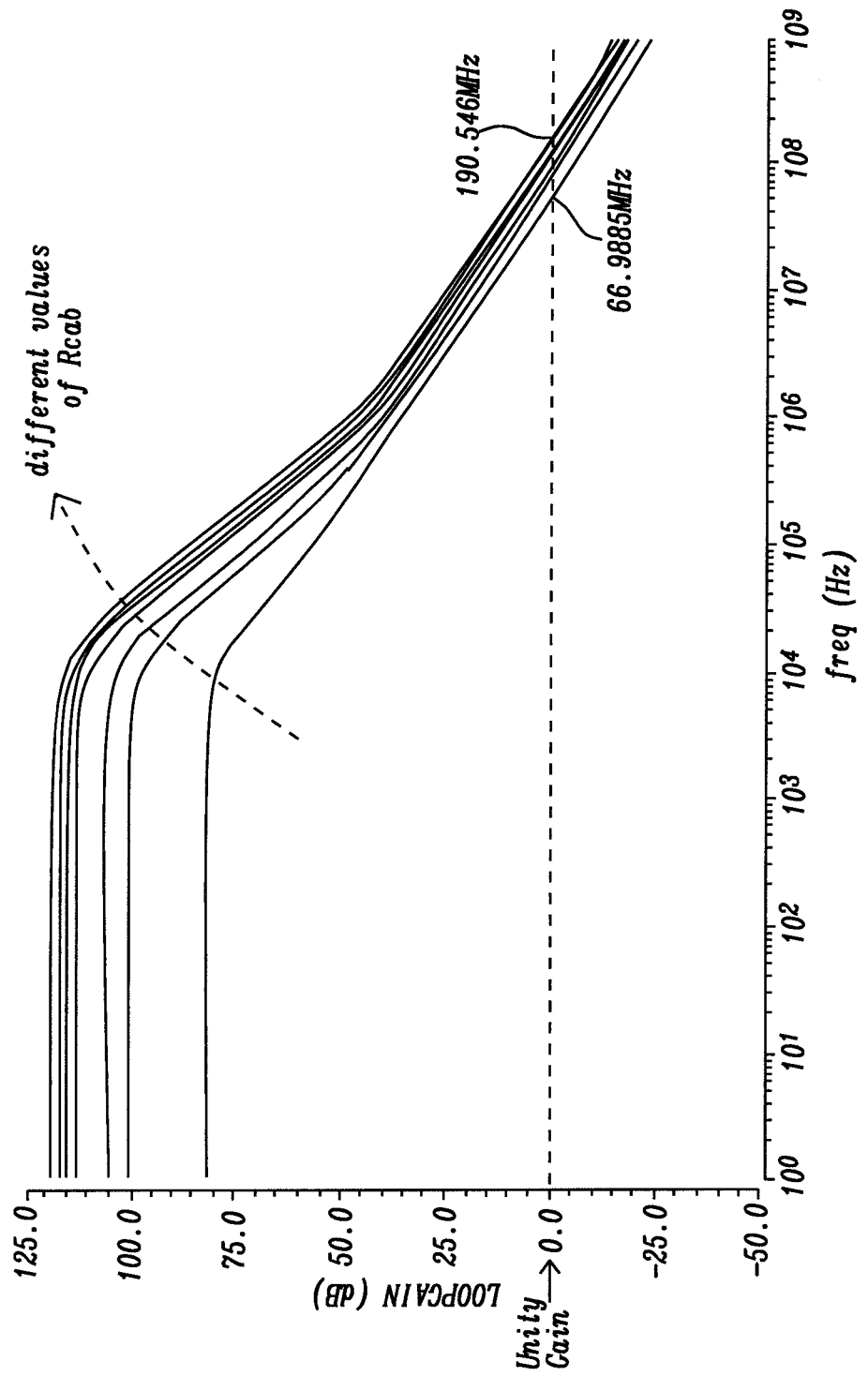

FIG. 5A and FIG. 5B illustrate simulated examples of frequency dependency of the DC loop gain $L_{DC}$ in the power converter circuit 200 of FIG. 4. FIG. 5A illustrates the frequency dependency of the DC loop gain $L_{DC}$ for different values of the cable resistance $R_{cab}$ between 20 mΩ and 2Ω (i.e., varying by a factor of 100), assuming $\tau_1 \gg \tau_2$. FIG. 5B illustrates the frequency dependency of the DC loop gain $L_{DC}$ for different values of the cable resistance $R_{cab}$ between 20 mΩ and 2Ω (i.e., varying by a factor of 100), assuming $\tau_1 = \tau_2$. As can be seen from these figures, the gain bandwidth (according to equation [6]) would vary by a factor of three, instead of by a factor of 100 that would be expected when not employing the voltage adjustment circuit and/or reference adjustment circuit.

Figure 6:
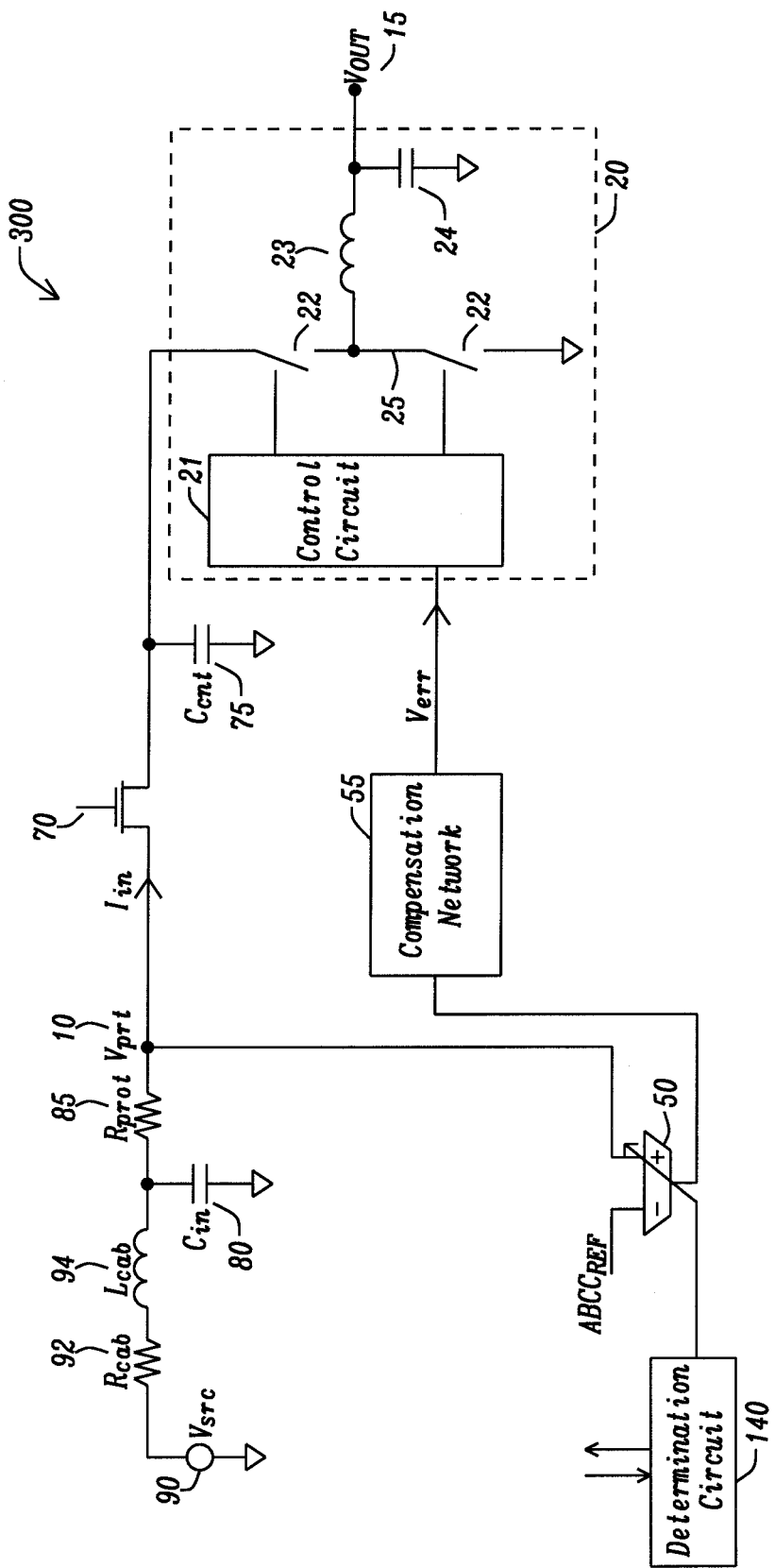

FIG. 6 schematically illustrates another example of a power converter circuit 300 according to embodiments of the disclosure. Unless indicated otherwise, like-numbered elements in FIG. 1 and FIG. 6 are identical and repeated description thereof is omitted for reasons of conciseness.

The power converter circuit 300 may comprise the elements of the power conversion circuit 100 of FIG. 1. Compared to the power converter circuit 100 of FIG. 1, the power converter circuit 300 may comprise an additional determination circuit (resistance determination circuit) 140 for determining a quantity indicative of a resistance of a circuit path (supply path) connected to the input node 10 and providing the input current $I_{in}$ (input voltage $V_{prt}$). For example, the determination circuit 140 may be configured to determine the cable resistance $R_{cab}$. Examples for methods and circuits (apparatus) that may be used to determine the cable resistance $R_{cab}$ will be described below. As in the case of the power converter circuit 100, in the power converter circuit 300 the error amplifier stage (e.g., including the error amplifier 50 and the compensation network 55) may generate the control signal for the DC-DC converter circuit 20 on the basis of the sensed voltage (e.g., the input voltage $V_{prt}$) and the reference voltage $ABCC_{REF}$. In the present case however, the error amplifier stage may be configured to generate the control signal further on the basis of the determined quantity determined by the determination circuit 140. That is, the error amplifier stage may generate the control signal on the basis of the sensed voltage, the reference voltage $ABCC_{REF}$, and the determined quantity (e.g., the cable resistance $R_{cab}$).

To this end, the error amplifier 50 of the error amplifier stage may receive the determined quantity (i.e., an indication thereof, such as, for example, a voltage or a current indicative of the determined quantity), for example at a control terminal of the error amplifier stage (e.g., error amplifier 50). The received indication may then be used to adjust a gain of the error amplifier 50. In general, the power converter circuit 300 may be said to comprise a circuit for adjusting the gain of the error amplifier 50 in dependence on (e.g., in accordance with) the determined quantity (e.g., cable resistance R_cab). For example, the gain of the error amplifier 50 may be increased in accordance with the received indication for small cable resistance $R_{cab}$, and/or may be decreased in accordance with the received indication for large cable resistance $R_{cab}$.

Next, examples for methods and circuits (apparatus) that may be used to monitor and/or determine the cable resistance $R_{cab}$ will be described with reference to FIG. 7 and FIG. 8.

In the following paragraphs, reference will be made to an apparatus for monitoring a charging system, which exemplarily embodies a powering system. The term "charging an electronic device" relates to a situation in which electrical energy is provided to the electronic device and some sort of energy storage on the electronic device (such as e.g. a battery or a supercapacitor) is replenished with the provided electrical energy. On the other hand, the term "powering an electronic device" relates to electronic devices which do not necessarily have an energy storage or to situations in which the electronic device has an energy storage, but this storage is not necessarily charged by the provided energy. The latter situation may occur e.g. when the energy storage is fully charged and the provided energy is directly consumed by the electronic device. The disclosure is not to be understood to be limited to a charging system, or to charging of a battery-powered device, but is to be understood to generally relate to a powering system and to powering a portable device.

Figure 7:
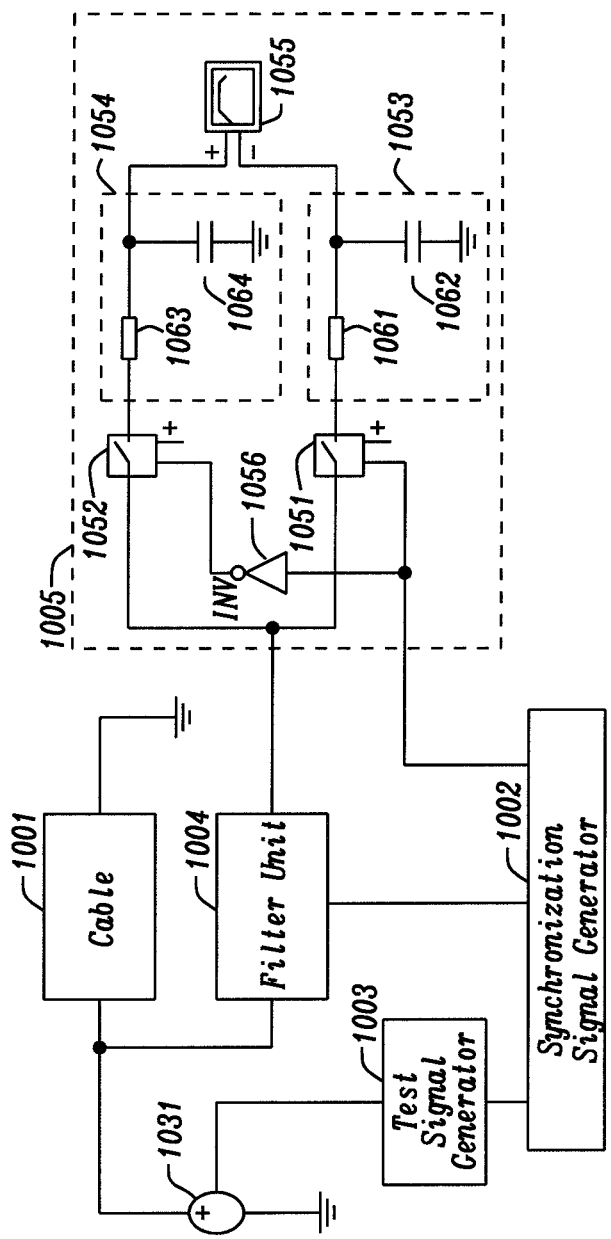

A high-level system block diagram of an apparatus for monitoring a process of charging an electronic device is illustrated in FIG. 7. The electronic device, which is not illustrated in FIG. 7, is charged via a cable 1001.

The apparatus for monitoring the charging process comprises: a synchronization signal generator 1002, test signal generator 1003, a filter unit 1004 and an impedance estimation unit 1005. The example apparatus depicted in FIG. 7 comprises a current source 1031, which is electrically coupled to and controlled by the test signal generator 1003. The current source 1031 is further connected to one end of cable 1001 for stimulating cable 1001 with one or more periodic test signals, such as e.g. sinus-shaped test signals. For instance, current source 1031 modulates a charging current for charging the electronic device with a sinus-shaped current modulation whose amplitude is small compared to the amplitude of the charging current. The test signals may be generated at one or more predetermined frequencies. Of course, current source 1031 may also be part of the test signal generator 1003 instead of being external to the latter.

In FIG. 7, filter unit 1004 is connected to the same end of cable 1001 as current source 1031. Filter unit 1004 is configured to receive a response signal which results from applying the test signal to the cable assembly including cable 1001. Besides cable 1001, the cable assembly may include connectors at one or both ends of cable 1001 as well as any printed circuit board (PCB) traces. In addition, the cable assembly may include further conductive components which are electrically coupled to cable 1001.

In FIG. 7, neither the electronic device nor a power supply is depicted. The electronic device and the power supply may be located at opposite ends of cable 1001 or at the same end of cable 1001. In particular, the electronic device may be located at the end of cable 1001 at which the current source 1031 and the filter unit 1004 are located and the power supply may be located at the other end of cable 1001. As illustrated in FIG. 7, both ends of cable 1001 are ultimately connected to the same absolute ground.

As illustrated in FIG. 7, the operation of the test signal generator 1003, the filter unit 1004 and the impedance estimation unit 1005 are synchronized by the synchronization signal generator 1002. For this purpose, the synchronization signal generator is electrically connected and transmitting synchronization signals to the latter components. The synchronization signals may be any kind of clock signals suitable for synchronizing analog and/or digital circuit components.

The filter unit 1004 may be a high pass filter or a bandpass filter for detecting the response signal. In any case, DC components should be removed from the response signal. As a consequence, the response signal may be a periodic (e.g. sinus-shaped or square wave) voltage variation which oscillates around a zero voltage level. At this, both phase and amplitude of the response signal may be changed in comparison to the test signal depending on the characteristics of the cable assembly. The amplitude of the response signal may be damped by any resistive components of the cable assembly, whereas any inductive or capacitive components of the cable assembly will cause a phase shift of the response signal relative to the test signal.

Next, the response signal is delivered to the impedance estimation unit 1005. The impedance estimation unit 1005 is configured to determine, based on both the response signal and the synchronization signal, a first quantity indicative of a real part of an impedance of the cable assembly and a second quantity indicative of an imaginary part of the impedance of the cable assembly. A first branch of the impedance estimation unit 1005 comprises a first switching unit 1051 and a first low pass filter 1053, which comprises a first resistor 1061 and a first capacitor 1062. In a first step, the response signal is fed to the first switching unit 1051 which is controlled by the synchronization signal generated by the synchronization signal generator 1002.

In the following description, a square wave oscillating between a high state and a low state with a duty cycle of 50% will be discussed as an exemplary embodiment of a synchronization signal. However, it should be noted that the present disclose is not limited to this specific clock signal and that other synchronization signals with various states and/or wave forms may be used instead.

Figure 8:
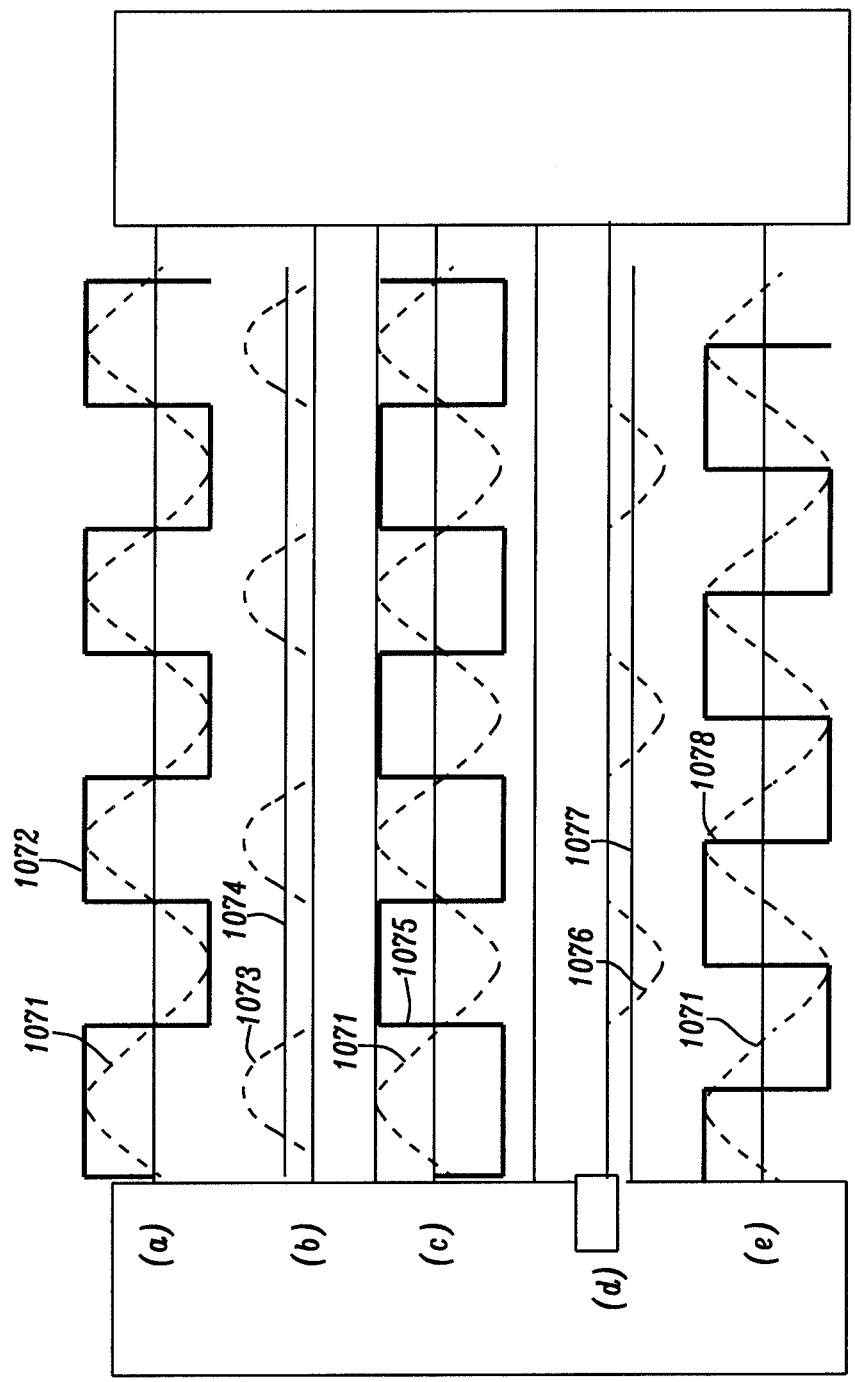

Diagrams (a) and (b) of FIG. 8 illustrate exemplary, simplified signal patterns in the first branch of the impedance estimation unit 1005. As can be seen in diagram (a), the response signal 1071 indicated by a dashed line is in phase with a synchronization signal 1072 which is indicated by a solid line. The illustrated exemplary response signal 1071 may be detected at one end of a cable if the cable assembly solely comprises resistive components and no phase shift has occurred due to inductive or capacitive components. Diagram (b) depicts the output signal 1073 of the first switching unit 1051 as a dashed line. Since the exemplary first switching unit 1051 is closed during times the synchronization signal 1072 is in a high state, the negative half-waves of the response signal 1071 are cut off in the output signal 1073 of the first switching unit 1051. After passing through the first low pass filter 1053, the output signal 1074, which is indicted by a solid line in diagram (b), represents a positive average value which is more or less constant over time.

Diagrams (c) and (d) in FIG. 8 illustrate exemplary, simplified signal patterns in a second branch of the impedance estimation unit 1005. The second branch of the impedance estimation unit 1005 comprises a second switching unit 1052 and a second low pass filter 1054, which comprises a second resistor 1063 and a second capacitor 1064. This time, however, an inverted synchronization signal 1075 of the synchronization signal 1072 is generated by an inverter 1056 and applied at a control input of the second switching unit 1052. In FIG. 8 (c), the inverted synchronization signal 1075 is indicated by a solid line. Once again it is assumed that the response signal 1071 did not undergo any phase shift and both signals illustrated in diagram (c) are in phase. As illustrated in diagram (d), the second switching unit 1052 removes the negative half-waves of the sinus-shaped response signal 1071 and generates the output signal 1076. Output signal 1076 is then averaged and a nearly constant, negative average value 1077 may be measured at the output of the second low pass filter 1054.

In a last step, a difference determination unit 1055 of the impedance estimation unit 105 determines the first quantity indicative of the real part of the complex impedance by computing a difference between the output signals 1074 and 1077 of the two branches. Although FIG. 7 shows the difference determination unit 1055 with a "minus"-symbol at the first branch and a "plus"-symbol at the second branch, it is obvious for those skilled in the art that both symbols may be interchanged. In any case, the difference determination unit 1055 computes a difference between the two average values provided by the two branches. The determined difference serves as an estimate for the real part of the complex impedance.

The second quantity indicative of an imaginary part of the complex impedance may be determined by the impedance estimation unit 1005 by using a shifted synchronization signal 1078. The latter signal is indicated by a solid line in diagram (e) of FIG. 8. The shifted synchronization signal may be generated by the synchronization signal generator 1002 by shifting a phase of the synchronization signal by +90 degree or −90 degree. Alternatively, the impedance estimation unit 1005 or some other unit of the apparatus may generate the shifted synchronization signal. As depicted in FIG. 7, the shifted synchronization signal is applied directly to the first branch and via inverter 1056 to the second branch of the impedance estimation unit 1005.

In diagram (e) of FIG. 8, it is still assumed that the response signal 1071 is in phase with the test signal. As a result the second quantity determined by the difference determination unit 1055 equals zero since both output signals of the two branches equal zero. Thus, for the chosen example, the imaginary part of impedance is zero due to missing capacitive or inductive components within the cable assembly.

The exemplary signals illustrated in FIG. 8 are considered helpful for understanding the present disclosure. Obviously, when a phase shift between the test signal and the response signal occurs, the output signals 1074, 1077 of the two branches may vary. For the special case of a response signal which is shifted by 90 degree with respect to the test signal, output signal 1074 of the first branch may equal zero and output signal 1077 of the second branch may have an average value different from zero representing the imaginary part of the complex impedance.

For detecting the response signal, filter unit 1004 may comprise an analog or digital bandpass filter. Since the measurement of the complex impedance has to be performed while the electronic device is charged, a bandwidth from which the predetermined frequency of the test signal has to be selected is constrained. In particular, a regulation loop for regulating the output voltage of the power supply (such as e.g. a wall plug charger WPC) may be active and it may not be possible to use a DC measurement. In addition, noise may originate from load transients of the charger circuit of the electronic device.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A power converter circuit for converting an input voltage received at an input node and providing, at an output node, a current at the converted voltage, the power converter circuit comprising:
    a DC-DC converter circuit for generating the current at the output node under control of a control signal, wherein the DC-DC converter circuit is controlled by the control signal to reduce the current at the input node if there is a drop in the input voltage;

a current sensing circuit for sensing a current indicative of a current at the input node;

a voltage adjustment circuit for sensing a voltage indicative of the input voltage and generating an adjusted voltage on the basis of the sensed voltage and the sensed current; and an error amplifier stage for generating the control signal on the basis of the adjusted voltage and a reference voltage, wherein the adjusted voltage is generated by adding a portion of the sensed current, after conversion to a voltage domain, to the sensed voltage, so that a loop gain of a control loop for the current at the input node has reduced sensitivity to an input resistance of a supply path that is connected to the input node and supplies the input voltage.

2. The power converter circuit according to claim 1, wherein the voltage adjustment circuit is configured to scale the sensed current.

3. The power converter circuit according to claim 1, wherein the voltage adjustment circuit comprises a controllable current sink for sinking, from a voltage level of the input voltage, a sink current that depends on the sensed current.

4. The power converter circuit according to claim 3, wherein the voltage adjustment circuit comprises an impedance for passing the sink current through the impedance.

5. The power converter circuit according to claim 4, wherein the voltage adjustment circuit comprises a circuit branch coupled between the voltage level of the input voltage and ground, the circuit branch comprising the impedance and the controllable current sink coupled in series.

6. The power converter circuit according to claim 1, further comprising:

a reference adjustment circuit for generating the reference voltage on the basis of the sensed voltage and a fixed reference voltage.

7. A power conversion method of converting an input voltage and providing an output current at the converted voltage, the method comprising:

performing DC-DC conversion under control of a control signal, for generating the output current, the DC-DC conversion is controlled by the control signal to reduce an input current if there is a drop in the input voltage;

sensing a current indicative of the input current;

sensing a voltage indicative of the input voltage;

generating an adjusted voltage on the basis of the sensed voltage and the sensed current; and generating the control signal on the basis of a difference between the adjusted voltage and a reference voltage, wherein the adjusted voltage is generated by adding a portion of the sensed current, after conversion to a voltage domain, to the sensed voltage, so that a loop gain of a control loop for the input current has reduced sensitivity to an input resistance of a supply path that supplies the input voltage.

8. The power conversion method according to claim 7, wherein generating the adjusted voltage involves scaling the sensed current.

9. The power conversion method according to claim 7, wherein generating the adjusted voltage involves sinking, from a voltage level of the input voltage, a sink current that depends on the sensed current.

10. The power conversion method according to claim 9, wherein generating the adjusted voltage involves passing the sink current through an impedance coupled between the voltage level of the input voltage and a controllable current sink that sinks the sink current.

11. The power conversion method according to claim 7, further comprising:

generating the reference voltage on the basis of the sensed voltage and a fixed reference voltage.

* * * * *